United States Patent [19]
Nakamura et al.

[11] 3,907,457
[45] Sept. 23, 1975

[54] LABYRINTH STRUCTURE FOR AIR OUTLET OF GAS TURBINE ENGINE BEARING CHAMBER

[75] Inventors: Kenya Nakamura, Okazaki; Hiroshi Okano, Susono, both of Japan

[73] Assignee: Toyota Jidosha Kogyo Kabushiki Kaisha, Japan

[22] Filed: Aug. 20, 1973

[21] Appl. No.: 389,813

[30] Foreign Application Priority Data
Aug. 21, 1972 Japan................................ 47-82856

[52] U.S. Cl. ............... 415/112; 415/172; 60/39.08; 60/39.51 R; 60/39.66; 277/57
[51] Int. Cl. ....... F01d 11/04; F02c 7/10; F02c 7/06
[58] Field of Search............. 60/39.66, 39.36, 39.08; 415/112, 113, 172, 173, 142, 110, 111; 277/55–57

[56] References Cited
UNITED STATES PATENTS

| | | | |
|---|---|---|---|
| 997,628 | 7/1911 | Ljungstrom | 277/57 |
| 1,382,941 | 6/1921 | Steenstrup | 277/57 X |
| 2,434,319 | 1/1948 | Kalitinsky | 415/112 |
| 2,749,087 | 6/1956 | La Torre | 60/39.66 |
| 2,788,951 | 4/1957 | Flint | 415/112 |
| 3,163,003 | 12/1964 | Paul et al. | 60/39.66 |
| 3,527,053 | 9/1970 | Horn | 60/39.66 |

*Primary Examiner*—William L. Freeh
*Assistant Examiner*—Robert E. Garrett
*Attorney, Agent, or Firm*—Toren, McGeady and Stanger

[57] ABSTRACT

The bearing chamber of a gas turbine engine is provided with an air outlet comprising a labyrinthine flow path. The bearing chamber is formed around the turbine main shaft at a high temperature portion thereof in the vicinity of the gas turbine. Intake air is fed to the chamber by the turbine compressor and a labyrinthine outlet flow path is formed by a pair of generally annular sections which comprise a first and a second plurality of generally concentric annular projections. Each of said plurality of annular projections are spaced apart to define annular spaces therebetween and said projections are arranged in a staggered opposed relationship with each of one of said plurality of projections extending into the annular spaces formed between pairs of the other of said plurality of projections. One of said plurality of projections has affixed thereto a plurality of thin walled annular plates which are located to extend diametrically from each projection and transversely across the spaces formed between the complementary plurality of projections. The plates terminate short of engagement with the complementary plurality of projections to define therebetween spaces which operates as flow orifices for regulating the flow rate of the air exhausting from the bearing chamber.

2 Claims, 7 Drawing Figures ial shaft 3, is connected to the radial turbine 5 by the main shaft 4. Furthermore, the compressor 2 is connected to a scroll-shaped intake duct (not shown), and the radial turbine 5 is likewise connected to a scroll-shaped exhaust duct (not shown).

LABYRINTH STRUCTURE FOR AIR OUTLET OF GAS TURBINE ENGINE BEARING CHAMBER

BACKGROUND OF THE INVENTION

1. Field of the Invention

The present invention relates generally to improvements in gas turbine engines, and more particularly a labyrinth structure forming an outlet air flow from the bearing chamber of a gas turbine engine. The bearing chamber is disposed in the vicinity of the turbine and receives intake air which is expelled therefrom in a regulated flow rate through the labyrinthine path defined by the structure of the present invention. The air thus supplied operates to effect cooling of the high temperature bearing of the turbine main shaft.

2. Description of the Prior Art

The main shaft of a gas turbine engine is usually supported on a high temperature side thereof by a bearing which is disposed in the vicinity of the turbine of the engine. In order to insure prolonged life of the high temperature bearing and of the turbine blades which are exposed to the hot combustion gases, the high temperature bearing should be sufficiently cooled with the turbine engine intake air whose flow rate must be properly regulated. Gas turbine engines have been known to be provided with a number of labyrinth rings which are positioned between the rotating turbine main shaft and the stationary portion of the engine structure. These labyrinth rings have their ring elements arranged at a suitable pitch in the axial direction of the main shaft in order to regulate the flow rate of the air which is flowing along the outer periphery of the main shaft. Accordingly, a considerable axial space is required for the labyrinth rings and a variety of problems are encountered when the particular rings are used for controlling the flow rate of the cooling air because the construction of such rings has not been found suitable for the regulation of flow rates of lower magnitude. Moreover, when a radial turbine is employed in the gas turbine engine, and when a bearing is overhung to be located as close as possible to the turbine blades so as to shift a critical speed of revolution of the turbine main shaft to a higher range than the normal speed of its revolution, it becomes impossible to interpose the aforementioned labyrinth into the space defined between such elements.

Accordingly, it is a primary object of the present invention to be provide an improved labyrinth structure which is free from the aforementioned drawbacks of conventional labyrinth rings.

Another object of the invention is to provide an improved labyrinth structure of simplified construction which has an increased cooling efficiency operating to cool the high temperature side bearing and the turbine blades.

It is a further object of the invention to provide an improved method for manufacturing a labyrinth structure of the aforementioned type.

SUMMARY OF THE INVENTION

Briefly, the present invention may be defined as air exhaust means for the bearing chamber of a gas turbine engine, said engine including a turbine main shaft, a turbine connected to said main shaft for rotation therewith, a bearing chamber formed around said main shaft in the vicinity of the turbine, means for supplying cold air to the bearing chamber, and a high temperature bearing mounted within the bearing chamber for supporting the main shaft. The exhaust means operate to controllably exhaust air from the bearing chamber and comprise a first plurality of generally concentric annular projections formed on a stationary wall portion of the turbine engine, said first projections being radially spaced apart to define annular spaces therebetween, a second plurality of generally concentric annular projections formed on a wall portion of the rotating turbine, said second projections also being radially spaced apart to define annular spaces therebetween, with said first and second projections being arranged in a staggered opposed relationship with each of one of said plurality of projections extending into the annular spaces formed between a pair of the other said plurality of projections. The assembly also includes a plurality of thin-walled annular plates affixed to each of the projections of at least one of said plurality of projections, said plates being located to extend diametrically from the projections to which they are affixed and transversely across the spaces formed by the complementary plurality of projections, with the plates terminating short of engagement with the complementary projections to define a spacing therebetween, said first and said second plurality of projections being located to define a labyrinthine flow path for air exhausting from said bearing chamber.

The invention also relates to a method for fixing the thin-walled annular plates to one of said plurality of projections, said method comprising the steps of securing a continuous sheet of thin walled plate material to each of said one plurality of projections in a position overlying the spaces formed therebetween, and cutting out portions of plate material overlying said spaces, said cut-out portions being of a width to permit insertion therethrough of said other plurality of projections with sufficient spacing to permit formation of orifices regulating the flow rate of air exhausting through the labyrinthine path.

BRIEF DESCRIPTION OF THE DRAWINGS

The present invention will be better understood by reference to the following detailed description of embodiments taken in connection with the accompanying drawings, wherein.

DETAILED DESCRIPTION OF THE PREFERRED EMBODIMENTS

Figure 1:
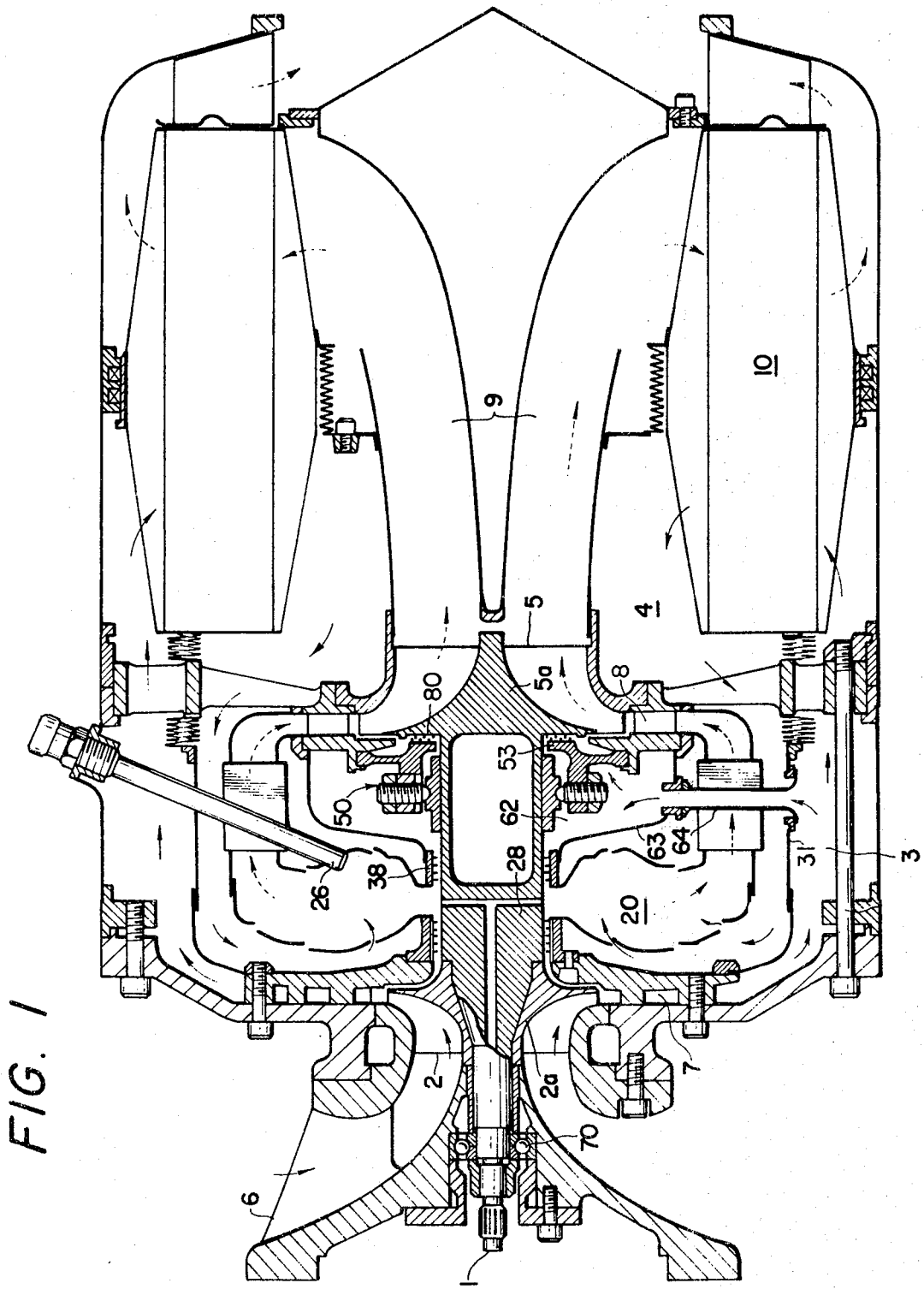
FIG. 1 is a longitudinal sectional view showing a gas turbine engine having a radial turbine and provided with a labyrinth structure according to the present invention.

Referring now to FIG. 1, a gas turbine engine having the present invention applied thereto is shown, for illustrative purposes only, as provided with a centrifugal type compressor 2 and with a radial type turbine 5. The compressor 2, which is operatively connected to a turbine main shaft 1, operates to compress intake air which is drawn from an air intake 6 by rotational motion of compressor wheel 2a in a cold pressurized condition for subsequent discharge into a heat exchanger 10 by way of a diffuser 7 and an air passage 3. The heat exchanger 10 operates to regenerate the heat content of the engine exhaust gases by performing a heat exchange operation between the engine exhaust gases which are discharged into the atmosphere through an exhaust duct 9 of the radial turbine 5, and the air which is entering from the air passage 3. Heated air is thus supplied through an air passage 4 to a combustion chamber 20 in which fuel injected from a fuel supply injector 28 formed in the main turbine shaft 1 is ignited by a spark plug 26 in the presence of the heat-exchanged hot air under pressure. The resultant combustion gases are then introduced into a turbine nozzle 8 in which the gases are expanded to rotate the main shaft 1 together with the turbine wheel 5a. Subsequently, the combustion gases, which have had work derived therefrom and which have been converted to hot gases of low pressure, are discharged to the atmosphere through the exhaust duct 9 and the heat exchanger 10 as previously described.

In a gas turbine engine of the type described, the main shaft 1 has its low temperature side supported by a deep groove ball bearing 70 and its high temperature side supported by a gas bearing 50 of the dynamic pressure type. The bearing 50 is mounted in a bearing chamber 62 which is isolated from the hot combustion gases by an outer wall 63 positioned to connect the turbine nozzle 8 and a labyrinth ring 38. The bearing chamber 62 is in fluid communication with the air passage 3 by way of a pipe 64 which connects the outer wall 63 with an inner cylinder 31 forming the passage 3. With this structural arrangement the cold pressurized air in the air passage 3 is partially introduced into the bearing chamber 62 to cool the gas bearing 50 and the turbine 5 with portions of the air being introduced into the combustion chamber 20 by way of the labyrinth ring 38. The remaining portion of the cold air under pressure has its flow rate regulated by a labyrinth structure 80 according to the present invention, and it is then introduced into the turbine nozzle 8.

Figure 2:
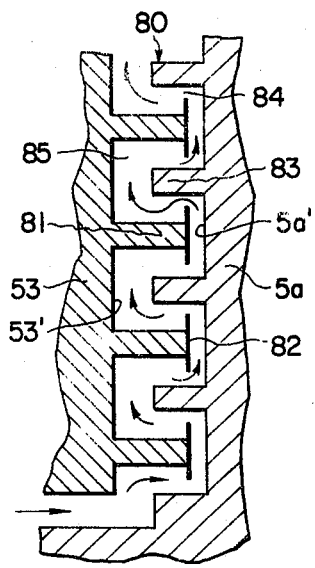
FIG. 2 is an enlarged cross-sectional view showing a labyrinth structure according to the invention.

Referring now to FIG. 2 the labrinth structure 80 of the invention is shown in an enlarged scale to include a stationary member or holder 53 which comprises a portion of the gas bearing 50 and which is secured to the turbine nozzle 8 in a position with the holder 53 in a face-to-face relationship with the disc of the turbine wheel 5a. On a facing surface 53' of the holder 53 which extends perpendicularly to the turbine main shaft 1, there are concentrically formed a plurality of annular projections 81 which are spaced apart a limited distance to form therebetween concentric annular spaces. The annular projections 81 are each formed at their axially extending ends with an annular thin plate 82 which has a radial width larger than that of the corresponding annular projections. On the facing disc surface 5a' of the turbine wheel 5a, which also extends perpendicularly to the main shaft 1, there are also concentrically formed a plurality of complementary annular projections 83 which are sized and positioned to alternately extend into the spaces defined between the adjacent pairs of annular projections. As a result a number of orifices 84 for regulating the flow rate of the cold air under pressure are formed between the radially inner and outer ends of the thin plates 82 and the inner and outer surfaces of the adjacent corresponding annular projections 83. Furthermore, labyrinthine air passages 85, within which the direction of the flowing air is reversed by about 180°, are formed between each of the annular projections 83 and the two adjacent complementary annular projections 81.

With this arrangement, cold air under pressure which has been introduced into the bearing chamber 63 is abruptly expanded when it passes through the orifices 84 thereby experiencing a pressure drop whereby its pressure level is finally brought to the level of the inlet of the turbine wheel 5a. This results in an effective choking operation caused by the orifices 84 and accordingly the flow rate which is achieved is considerably reduced to a low level. Additionally, a considerable amount of pressure resistance is achieved in the orifices 84 due to the existence of flow vortexes and due to the reversal of flow directions which occurs within the labyrinthine passages 85. Accordingly, air flow rate is further reduced to obtain a high degree of flow regulation.

As previously described, the flow rate of the cold air to be supplied from the bearing chamber 62 directly into the turbine wheel 5a is properly regulated by the labyrinth structure of the present invention. Thus, as a result of the operation of the invention, the gas bearing 50 is appropriately cooled and many of the disadvantages attendant in prior art devices are obviated. For example, the present invention avoids excessive lowering of the temperature of the combustion gases which are introduced from the combustion chamber 20 into the turbine blades 5a. Furthermore, the present invention avoids the useless escape of an excessive amount of the cold air which has been compressed in the centrifugal compressor 2 which escape would result in loss of some of the work which the cold air is capable of performing. Moreover, cold air properly metered as a result of operation of the invention will flow in contact with the facing disc surface 5a' of the turbine wheel 5a and the annular projections 83, thereby resulting in significant improvement in the cooling effects which are achieved at the contacting surfaces. Additionally, a turbulent boundary layer of high intensity is formed on the facing disc surface 5a' as a result of the formation of intense flow vortexes which occur both in the orifices 84 and in the labyrinthine passages 85. This will promote cooling of the turbine wheel 5a due to the increased heat transfer which takes place between the cold air and the wheel 5a.

In view of the mechanical strength of the thin plate 82, the location of the plate is preferably selected at the stationary side of the structure, as shown in connection with the embodiment described herein. However, it should be understood that this is not necessarily an essential limitation of the invention and that the plates 82 may be located on the projections 83 extending from the side of the structure adjacent the turbine wheel 5a. In terms of the dimensions to be selected for the thin plates 82 the thickness of the plates is preferably selected to be as thin as possible in order to obtain the most efficient choking effect. Moreover, since the turbine wheel 5a will extend in an axial direction rearwardly as a result of thermal expansion, this extension should be taken into consideration in advance so that the entrance of the annular projections 83 into the spaces between the projections 81 are arranged to compensate for the rearward extension of the turbine wheel 5a as a result of thermal expansion.

Figures 3A, 3B, 3C, 3D:
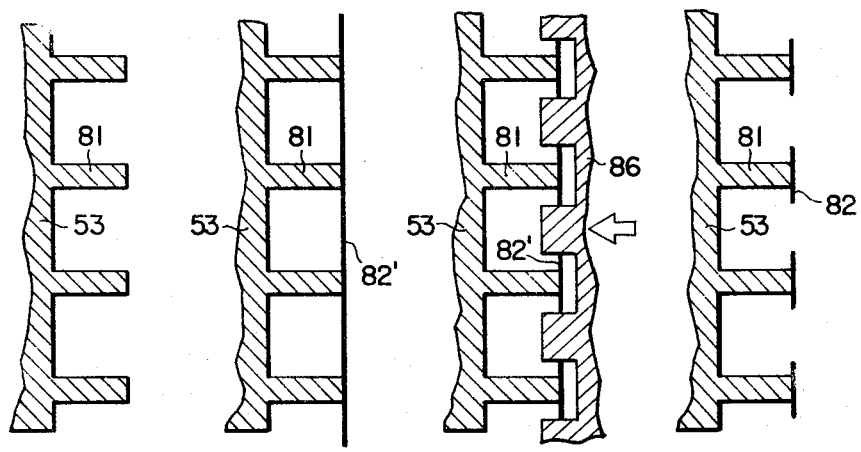
FIGS. 3(a) to 3(d) are cross-sectional views depicting the steps of the manufacturing process used in forming the labyrinth structure of the present invention.

Referring now to FIGS. 3(a) – 3(d), the process of securing the thin plates 82 to the axially extending ends of the projections 81 will be described. As shown in FIG. 3(a), the holder 53 is machined to integrally form thereon the annular projections 81 in a concentric relationship relative to each other and to define therebetween the required annular spacing. As a subsequent step in the manufacturing procedure, a wide sheet of thin plate 82' is secured to each of the axial free ends of the projections 81 in a manner to accomplish sufficient heat resistivity. Any suitable method of attachment such as electron beam welding, highly heat resistive brazing, or similar methods may be utilized. After the plate 82' is approximately affixed as shown in FIG. 3(b) the plate is further formed in a manner depicted in FIG. 3(c). In order to provide space for the annular projections 83, the plate 82' has a series of cutouts formed therein at points where the plate overlies the spaces between the projections 81. This operation may be performed by the discharge machining method, or similar procedure, wherein a number of electrodes 86 are disposed at positions corresponding to those of the projections 83. After the cutouts have been formed, a number of annular thin plates are fixed to the respective projections 81 and precisely positioned at spacings from each other, will be formed in the manner depicted in FIG. 3(d).

Figure 4:
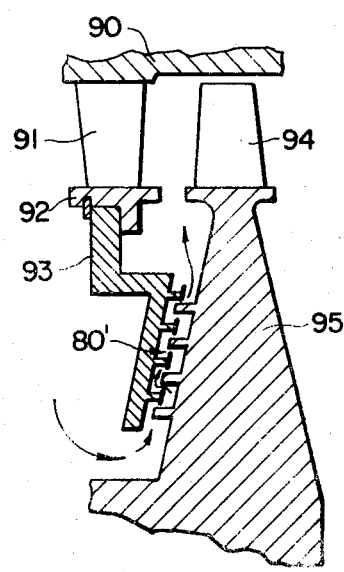
FIG. 4 is a sectional view similar to FIG. 1 showing another embodiment of the invention as applied to a turbine engine equipped with an axial turbine.

Referring now to FIG. 4, another embodiment of the invention will be described in which a turbine of the axial type is employed in the gas turbine engine involved. For simplicity of explanation, the following description will be limited to those portions which have a construction and a mode of operation different from what has been described in connection with the embodiment of FIG. 1.

In this second embodiment, hot combustion gases under pressure which are produced in the combustion chamber 20 are guided by stationary blades 91 of an axial turbine 90 to rotational blades 94 which are attached to a disc 95 integrally formed with a turbine main shaft 1. The gas bearing 50 which is of the dynamic pressure type is mounted on a nozzle flange 92 which acts to support the inner sides of the stationary blades 91. When the turbine main shaft 1 is rotated together with the rotational blades 94, an engine output is extracted. It should be noted that in this embodiment a labyrinth plate 93 is secured to the nozzle flange 92 and that a labyrinth structure 80' which is formed in accordance with the principles of the present invention is interposed between the plate 93 and the disc 95 with an inclination toward the latter. The regulating operation of the air flow rate is similar to that described in connection with the first embodiment, and accordingly a description thereof will not be repeated and has been omitted.

As described in the foregoing, the labyrinth structure according to the present invention is disposed on a surface of the turbine disc in the radial direction of the turbine main shaft so that the axial spacing required may be minimized and so that the high temperature side of the bearing supporting the high temperature portion of the main turbine shaft may be positioned in the vicinity of the turbine to thereby enable a higher critical speed of revolution without adversely affecting the cooling effects of the gas bearing 50 and the turbine 5. The orifices 84 are formed at both the radially inner and outer sides of the respective thin plates 82 so that the radial spacing required may also be minimized. Since the thin plates 82 and the cooperating projections have their overlapping portions extending in the axial direction, that is in the direction of thermal expansion of the turbine 5, the regulating effects will not be deteriorated by the relative retractions caused by thermal expansion. The interconnections between the projections 81 and the thin plates 82 are made by utilizing an adhering method which enables the achievement with relative ease of a sufficient precision for the interconnection with a sufficient grade then would otherwise be obtainable from conventional machine working methods. This adhering method is such that the thickness of the thin plates 82 may be maintained at a minimum in order to improve the regulating efficiency of the device.

While specific embodiments of the invention have been shown and described in detail to illustrate the application of the inventive priciples, it will be understood that the invention may be embodied otherwise without departing from such principles.

what is claimed is:

1. In a gas turbine engine including a turbine main shaft, a turbine connected to said main shaft for rotation therewith, a bearing chamber formed around said main shaft in the vicinity of said turbine, means for supplying cold air to said bearing chamber, a gas bearing mounted within said bearing chamber for supporting a high temperature side of said main shaft, and means for controllably exhausting air from said bearing chamber, the improvement wherein said air exhaust means comprise a first plurality of generally concentric annular projections formed on a stationary wall portion of said turbine engine, said first projections being spaced apart radially of said turbine shaft and extending in a direction axially thereof to define annular spaces therebetween, a second plurality of generally concentric annular projections formed on a wall portion of said rotatable turbine, said second projections being spaced apart radially of said turbine main shaft and extending in a direction axially thereof to define annular spaces therebetween, said first and said second projections being arranged in a staggered opposed relationship with each of the projections of one of said plurality of projections extending into the annular spaces formed between the other of said plurality of projections, and a plurality of thin walled annular plates affixed to each of the projections of at least one of said plurality of projections, said plates being located to extend diametrically from the projections to which they are affixed and transversely across said spaces formed between said other plurality of projections, said plates terminating short of engagement with the projections of said other plurality of projections to define a spacing therebetween, said first and said second plurality of projections being located to define a labyrinthine flow path for air exhausting from said bearing chamber, said labyrinthine flow path as defined by said first and second plurality of projections being located between said turbine and said gas bearing.

2. An engine according to claim 1 wherein said plurality of thin walled annular plates are affixed only to said first plurality of annular projections.

* * * * *